United States Patent [19]

Le Roy et al.

[11] Patent Number: 5,434,893
[45] Date of Patent: Jul. 18, 1995

[54] COMPONENT FOR A DIFFERENTIAL TRANSMITTER-RECEIVER OF SIGNALS WITH DIRECT SEQUENCE SPREAD SPECTRUM AND THE CORRESPONDING TRANSMITTER-RECEIVER

[76] Inventors: Alain Le Roy, 24, Allée des Brandons, 38240 Meylan; Louis Penavaire, 39 Rue du Docteur Pierre Richelmi, 06300 Nice; Charles Fort, Lieu dit Chapamand, 38470 Vatilieu, all of France

[21] Appl. No.: 161,877

[22] Filed: Dec. 3, 1993

[30] Foreign Application Priority Data

Dec. 22, 1992 [FR] France .................. 92 15469

[51] Int. Cl.⁶ .................................. H04B 1/707
[52] U.S. Cl. ........................ 375/208; 375/206; 379/304; 364/821; 455/207
[58] Field of Search ........... 375/1, 56, 84; 329/304; 364/821; 455/207, 214, 276

[56] References Cited

U.S. PATENT DOCUMENTS 4,506,239 3/1985 Cho et al. .

FOREIGN PATENT DOCUMENTS 0409538 7/1990 European Pat. Off. .
0474491 9/1991 European Pat. Off. .
2312881 12/1976 France .

OTHER PUBLICATIONS

French Search Report—FR 9215469—FA 485824—Aug. 1993.

*Primary Examiner*—David C. Cain

[57] ABSTRACT

The component essentially comprises two correlators (TR1, F1), (TR2, F2) shifted by one period or cycle from the information element. This component fulfils both the correlation and delay functions. The component also comprises a transmission channel with a filter identical to the correlator of the reception channel.

Application to radiocommunications.

7 Claims, 5 Drawing Sheets

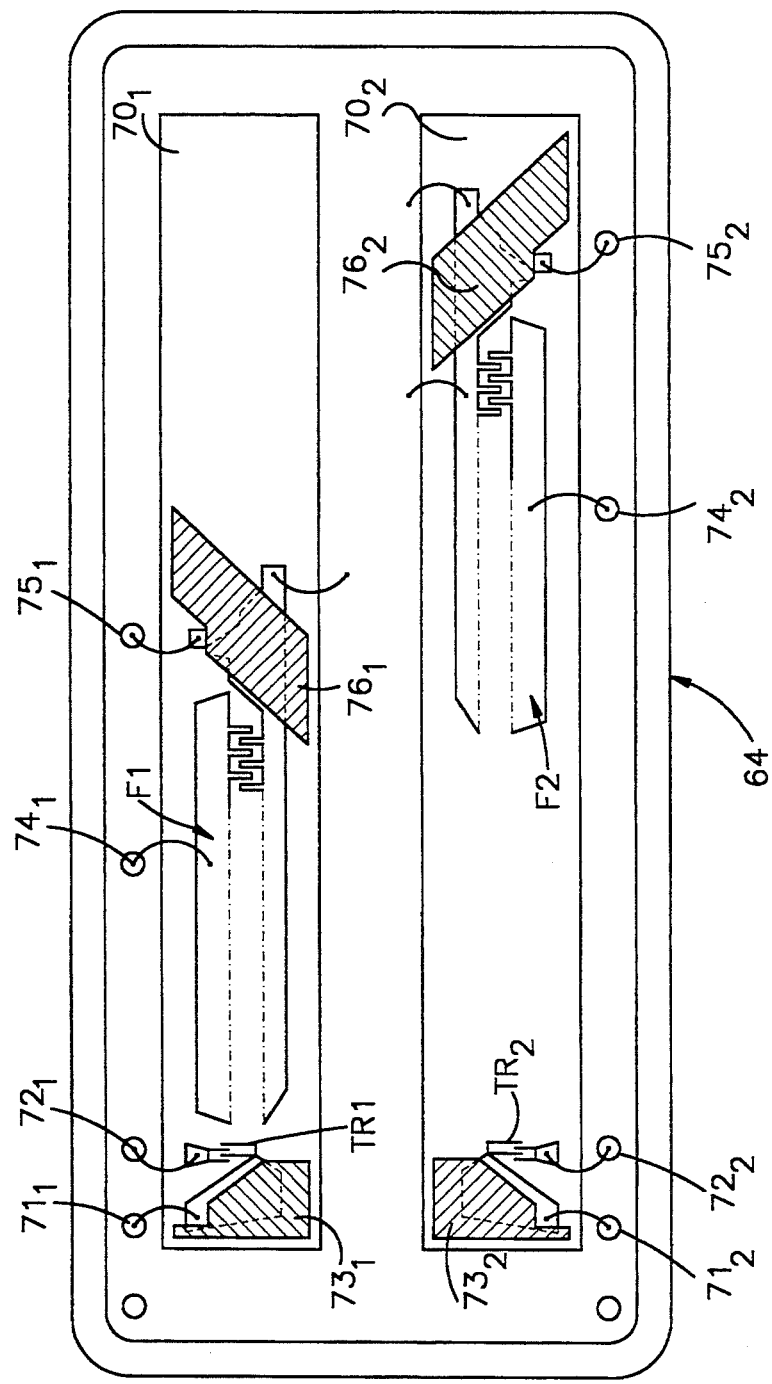

COMPONENT FOR A DIFFERENTIAL TRANSMITTER-RECEIVER OF SIGNALS WITH DIRECT SEQUENCE SPREAD SPECTRUM AND THE CORRESPONDING TRANSMITTER-RECEIVER

TECHNICAL FIELD

The present invention relates to a component for a differential transmitter-receiver with direct sequence spread spectrum and a transmitter-receiver with direct sequence spread spectrum.

PRIOR ART

The spread spectrum procedure has been used for many years in military radiocommunications, essentially because it makes it possible to establish discrete links, is difficult to intercept and resists jamming. Conventionally two spreading methods are used, namely spectrum spread by frequency jumping and spectrum spread by direct sequence.

Spectrum spread by frequency jumping (also known as frequency evasion) is the procedure used for military applications. It consists of changing the radio carrier frequency as often as possible (up to several hundred times per second) according to a law which is only known to friendly receivers. This law, which is governed by one or more pseudo-random sequences, constitutes the access code to the link. This procedure requires the use of agile frequency synthesizers. It is therefore onerous and there are few applications in the civil sphere.

The other procedure, namely direct sequence spread spectrum or DSSS, consists of transforming the signal to be transmitted, whose spectral band is $B_S$, into a signal having the properties of a white noise, whose spectral band is much larger $B_{ES}$. This spreading operation is carried out by multiplying the message to be transmitted by a pseudo-random sequence formed from bits able to assume the values $+1$ or $-1$. If T is the period or cycle of the information elements to be transmitted and $T_c$ the duration of a binary element of the pseudo-random sequence (also known as chip), it is possible to define a fundamental quality of the spread modulation of the spectrum, namely the processing gain N, by the relation:

$$N = (T/T_c) = (B_{ES}/B_S)$$

This processing gain can vary as a function of the particular case from 10 to several tens of thousands, the conventional values in radio-communications never exceeding 1000.

In order to be able to find the information again, the receiver must be able to carry out a correlation operation between the message received and a pseudo-random sequence identical to that used for performing the spreading operation. Therefore the receiver must know this sequence, which constitutes the access code to the transmitted message. Two independent messages can be transmitted by using the same frequency band and two orthogonal sequences, i.e. two sequences having weak intercorrelation coefficients.

The most important advantages of the direct sequence spread spectrum method are:
  the same frequency band can be shared by systems using a narrow band modulation and those using spectrum spread and the former will only note a slight increase in ambient radio noise, because the spreading sequences have the spectral characteristics of a noise, whereas the latter will carry out a rejection of the narrow band modulations as a result of the correlation operation;
  Several spread spectrum links can share the same frequency band by using orthogonal pseudo-random frequencies, but unfortunately this method (which is known as codistribution multiple access or CDMA) is difficult to perform and imposes a control of the transmitted power;
  a spread spectrum transmission is difficult to intercept, because the receiver must know the spreading sequence in order to be able to correctly demodulate the data, but in actual fact often a partial knowledge of the sequence is adequate;
  a spread spectrum transmission is relatively resistant to jamming stations and interference and this more particularly applies as the processing gain increases. However, it is necessary to temper this advantage to a certain extent because, compared with a narrow band link and in the case of a civil application where account only has to be taken of interference and not ill intentioned jamming stations, so that by multiplying the band by N, it is possible to intercept a noise power due to the interference N times stronger on average and which is rejected with a processing gain equal to N, so that the resistance to said interference is no greater than for conventional methods.

Apart from a better radio spectrum control (because this method makes it possible to share the same frequency bands as certain narrow band transmissions), direct sequence spread spectrum would not appear to have many advantages. The vital interest of this method appears on analyzing the behaviour of said modulation in radio channels in the presence of multiple paths.

The direct sequence spread spectrum method has applications in radio transmissions with road vehicles, in wireless data processing local networks, data transmissions in an industrial environment and more particularly in all radio transmissions within buildings.

In this type of environment, the propagation of the radio wave takes place in accordance with multiple paths involving reflection phenomena (on walls and partitions), diffraction phenomena (on edges) and diffusion phenomena. Moreover, in the general case, there is no direct path between the transmitter and receiver.

This multiple path propagation induces a certain number of parasitic effects, which are prejudicial to the quality of the transmission and sometimes even make it unusable. Apart from the significant attenuation of the radio signal during its propagation (because it has to pass through partitions), the other disturbing effects are described below.

a) The expansion of the pulse response of the channel. This is due to the fact that all the paths have different propagation times, which imposes a limit value of the information flow in the channel. The duration of the transmitted symbol must be much greater than said pulse response width in order to obtain a reasonable error rate.

b) Fading, which is due to a destructive vector summation of the signal on the receiving antenna. Thus, the received signal level is subject to significant fluctuations during the displacement of the receiving antenna. These fluctuations even exist with fixed antennas. In this case they are produced by movements of vehicles or personnel in the radio path. Such fading obviously brings about a deterioration in the transmission quality. The methods conventionally used for improving this quality are so-called diversity methods, which consist of using several receiving antennas. The increase in costs resulting from the adoption of these methods means that they are essentially only used in military systems.

c) Doppler noise or parasitic frequency modulation. The lower the data rate the more prejudicial this effect. It is not a frequency shift but in fact a noise, because the arrival directions of the different radio paths are of a random nature. The higher the radiofrequency and vehicle speed the stronger this phenomenon.

In this type of radio channel, the direct sequence spread spectrum method with differential phase modulation makes it possible to ensure a good transmission quality, provided that a number of rules which fix the modulation parameters are respected.

These transmission methods are described in numerous works and articles. Reference can e.g. be made to the work entitled "Spread Spectrum Communications" by Marvin K. SIMON et al, Computer Science Press, 1983, vol. I and the following articles:

"Design and experimental results for a direct-sequence spread-spectrum radio using differential phase shift keying modulation for indoor wireless communications", by M. KAVEHRAD et al, published by IEEE Journal on SAC, vol.SAC 5, no.5, Jun. 1987, pp.815–823, "Performance of differentially coherent digital communications over frequency-selective fading channels", by F. D. GARBER et al, published in IEEE Trans on Communications, vol.36, no.1, Jan. 1988, pp.21–31.

"Direct-sequence spread spectrum with DPSK modulation and diversity for indoor wireless communications", by M. K. KAVEHRAD et al, published in IEEE Trans on Communications, vol.COM-35, no.2, Feb. 1987, pp.224–236.

FIG. 1 shows a known receiver able to process the signals with direct sequence spread spectrum. This receiver firstly comprises a radio-frequency stage E(RF), then an intermediate frequency stage E(FI) and finally a base band stage E(BB).

The radio-frequency stage E(RF) comprises a receiving antenna 10, a filter 12, whose band is equal to or greater $B_{ES}$, an amplifier 14, a local oscillator (16) supplying a frequency $F_{OL}$ and a mixer 18. The latter supplies an intermediate frequency signal FI resulting from the mixing of the incident frequency and the frequency of the local oscillator 16.

The intermediate signal processing device comprises a filter 20, whose band is still equal or greater than $B_{ES}$ and an amplifier 22, whose output 24 is connected to a gain control circuit 26 for automatically adjusting the gains of the amplifiers 14 and 22, so that the power of the intermediate frequency signal at the output 24 is constant.

The signal supplied by the output 24 is then applied to a correlator 30, which supplies on its output a signal S1 resulting from the correlation between the signal received and the spread sequence used on transmission.

This correlation signal is also applied to a delay or lag line 32, which supplies a signal S2 identical to S1 but shifted by a time equal to the period of the information elements to be transmitted. The two signals S1 and S2 are then applied to two amplifiers 34 and 36. A gain control circuit 40 controls the gain of the amplifier 34 and 36.

As the modulation used is a differential phase modulation, the information is carried by the phase difference between the signals S1 and S2. This information is extracted with the aid of the multiplier 38. If the signal at the circuit output is positive S1 and S2 are in phase, whereas they are in phase opposition if it is negative.

The base band stage comprises a low-pass filter 42, whose function is to reject the harmonics of the mixture, and an integrator 44. The function of the integrator is vital in the case of a propagation by multiple paths. In this case, to each path corresponds a correlation peak in S1 and S2 and therefore each path supplies information. The integrator 44 summates all the informations carried by these paths. Therefore it carries out the processing operation by path diversity.

The signals at the output of the integrator 44 are then supplied to a circuit 46 for the recovery of the clock and to two comparators 48 and 50. A data recovery circuit 52 finally supplies the data D. As in most data transmission receivers, there is finally a module for the detection and correction of transmission errors 54. Finally, on one output 56 the circuit supplies the data D and on another output 58 the clock pulses H.

Both the correlator 30 and the delay line 32 can be in the form of a surface acoustic wave or SAW device. This is e.g. described in the article by Mohsen KAVEHRAD et al referred to hereinbefore (FIG. 4, p.817). In reality, the correlator is a matched filter. It is in the form of a surface wave device and is followed by an amplifier, whose output is subdivided into two channels, one connected to a delay line in the form of a surface acoustic wave device and the other, directly connected to a multiplier and which also receives the delayed signals.

Numerous articles describe surface acoustic wave devices and in particular that entitled "Practical Surface Acoustic Wave Devices", published by Melvin G. HOLLAND et al in Proceedings of the IEEE, vol.62, no.5, May 1974, pp.582–611. The application to spread spectrum communications is more particularly described in the article entitled "Application of acoustic surface-wave technology to spread spectrum communications" published by D. T. BELL et al in IEEE Trans on MTT, vol.MTT 21, no.4, April 1973, pp.263–271.

The matched filter or correlator, which performs the correlation operation, is formed, in the same way as all surface acoustic wave filters, from two surface wave transducers deposited on a piezoelectric material which, in the case of phase modulated signals is generally made from quartz for thermal stability reasons with respect to the characteristics of the component (in particular centre frequency). It is known that the pulse response of such a device is the convolution product of the pulse responses of the two transducers. Ideally it is equal to the inverse in time of the signal to which the filter must be matched. The transducers are of the "split finger" type, whose electrodes or fingers must have lengths which are constant or variable as a function of their position. They are produced by depositing aluminium (a thickness of a few hundred to a few thousand angstroms) on the substrate used. Such components are described and proposed in the catalogues of various surface wave component suppliers. It can be added that in the case of filters matched to phase coded signals, such as is the case for the described receiver system, the requisite relative pass bands are generally too wide to permit the use of transducers other than those generally known and which are bidirectional. The surface acoustic waves other than those which propagate between the two transducers are attenuated by depositing on the zones located between each transducer and the edge of the substrate closest to it an appropriate material generally in the form of an adhesive or glue. This prevents uncontrolled phase and amplitude signals due to reflections on the edges of the substrate.

Ideally, the delay line transfer function must be at constant amplitude and linear phase (i.e. constant delay) in a frequency band at least equal to that which is occupied by the system of the signal obtained at the output of the matched filter so as not to bring about a deterioration of the characteristics of the latter. Moreover, the delay must be obtained with considerable accuracy and it must be ensured that it is temperature-stable so that the phase comparison between two successive correlation peaks is valid.

The accuracy and temperature-stability of the delay generally require the use of quartz as the piezoelectric substrate. Unfortunately the pass band of said delay line must be so large (130 MHz in the case of interest here for a centre frequency of 261.12 MHz), that it is virtually impossible to envisage the production of a delay line with sufficiently small phase distortions for said application.

A solution described in EP-A-409 538 consists of using means able to fulfil both the correlation function and the delay function, said means using two analog surface acoustic wave correlators, the second being shifted with respect to the first by a period corresponding to the duration of a binary information symbol received.

The present invention goes beyond these reception methods by proposing a component able to operate not only in reception, but also in transmission, which significantly simplifies the construction of a transmitter receiver or transceiver using the direct sequence spread spectrum method.

DESCRIPTION OF THE INVENTION

More specifically, the present invention relates to a component for a differential transmitter-receiver for signals with direct sequence spread spectrum, characterized in that it comprises:
a) a transmission channel incorporating a filter having a pulse response which is a pseudo-random sequence,
b) a reception channel constituted by:
  a first correlator able to perform the correlation between a signal applied to its input and a pseudo-random sequence identical to that used in the transmission channel,
  a second correlator differing from the first solely by the fact that the signal at the output of said correlator is delayed by a period corresponding to the duration of a received binary information symbol, the first and second correlators being filters, whose pulse response is the pseudo-random sequence used in the transmission channel, but reversed in time.

The filter of the transmission channel can be constituted by a surface acoustic wave device having an input transducer and an output transducer.

The output transducer of the transmission channel can be produced in the form of a split finger transducer having a length such that the time taken by the acoustic waves to pass through it is equal to the period corresponding to the duration of a transmitted and received binary information symbol.

The surface acoustic wave device of the transmission channel and the surface acoustic wave device of the first correlator of the reception channel can be produced on the same piezoelectric substrate. They can be arranged symmetrically to one another in a head to tail arrangement.

The present application also relates to a differential transmitter-receiver with spread spectrum. This transceiver is characterized in that it comprises the transceiver component defined hereinbefore, said component being used in its transmission channel for producing a spread spectrum intermediate frequency signal, said component also being used in its reception channel as the processing device of the intermediate frequency signal able to perform a correlation with the pseudo-random sequence used on transmission. This transceiver is also characterized in that the means of the transmission channel for converting the intermediate frequency signal into a radio-frequency signal are the same as the means of the reception channel for converting the radio-frequency signal into an intermediate frequency signal.

BRIEF DESCRIPTION OF THE DRAWINGS

FIG. 3 Illustrates an embodiment of this component.

DETAILED DESCRIPTION OF AN EMBODIMENT

Figure 1:
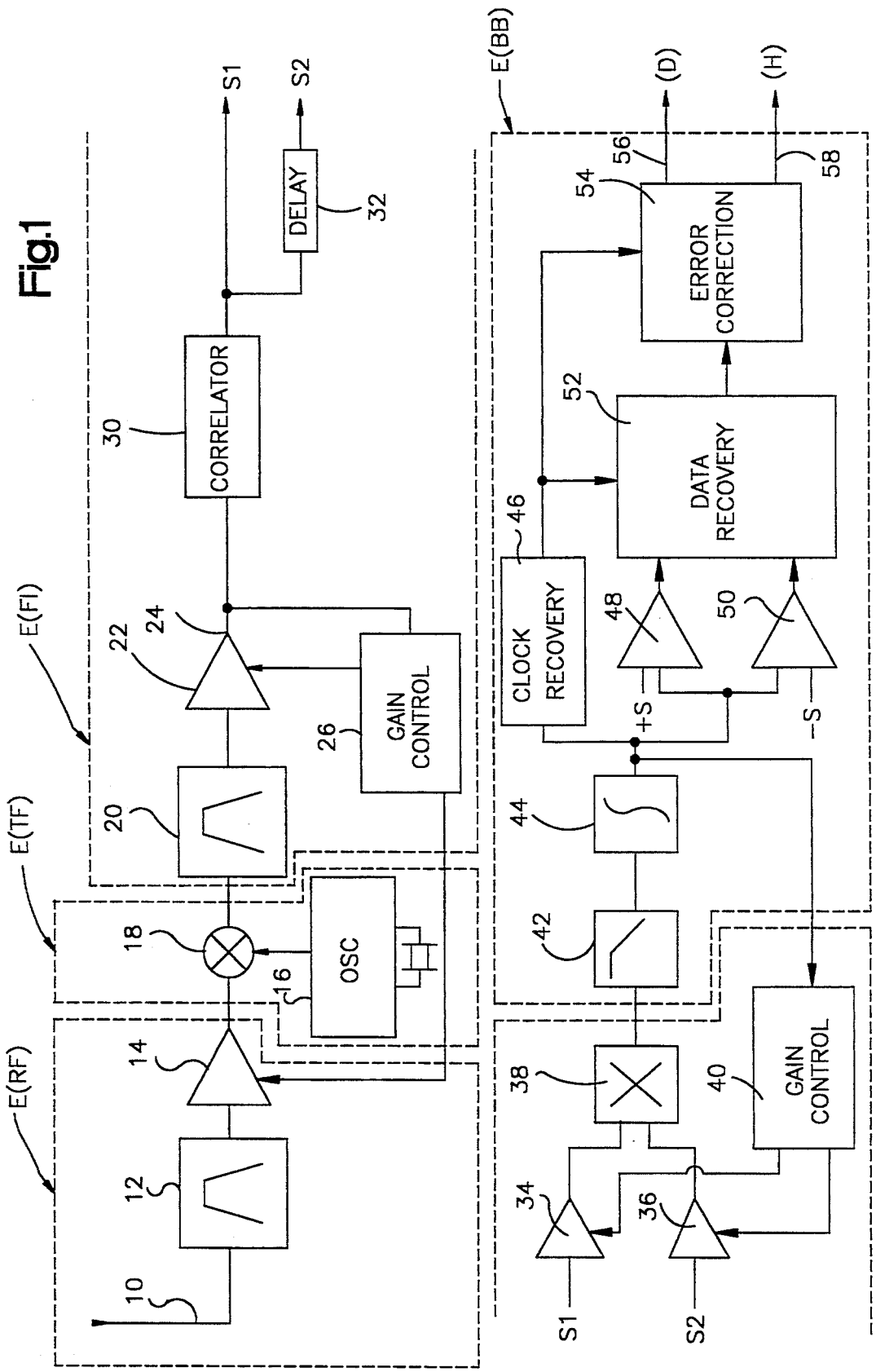
FIG. 1 Already described, illustrates a prior art spread spectrum receiver.
Figure 2:
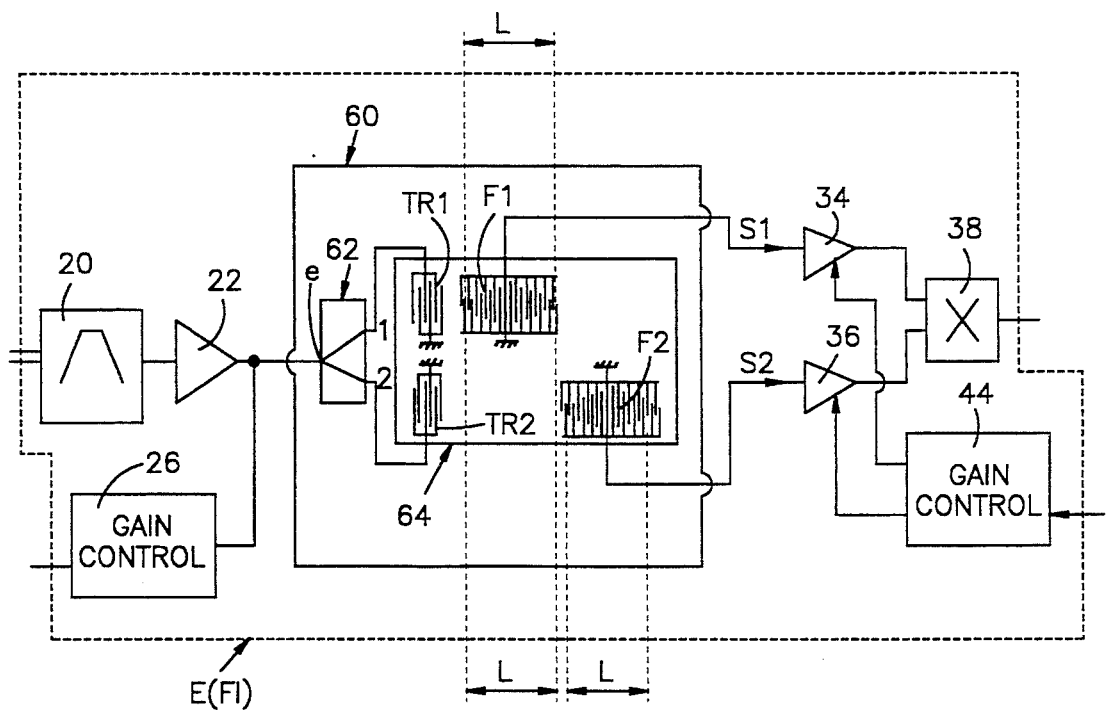
FIG. 2 Shows a component according to a variant of the invention.

The diagram of FIG. 2 shows the space occupied by the reception part of the component according to the invention in a receiver and more particularly in an intermediate frequency stage. Elements of this stage have already been shown in FIG. 1 and therefore carry the same references. Upstream of the filter 20 they consist of the amplifier 22 and the gain control circuit 26 and, downstream thereof, two amplifiers 34, 36, the mixer 38 and the gain control circuit 40. The component according to the invention carries the reference 60 and is inserted between the amplifier 22 and the amplifiers 34, 36. It comprises a 3 dB coupler 62 having one input e and two outputs s1, s2, as well as a surface acoustic wave device 64. As shown, said device comprises a first channel with an input transducer TR1 and a first correlator C1 supplying a signal S1 and a second channel with a transducer TR2 and second correlator C2 supplying a signal S2. The second correlator is shifted with respect to the first, which leads to a delay of S2 with S1.

This component functions as follows. The intermediate frequency signal E is subdivided into two with the aid of the coupler 62. Therefore two identical signals E1, E2 are created with power levels equal to half that of the induced signal. These two signals are then filtered by the surface acoustic wave filters of the two channels. The two outputs S1 and S2 of said filter are identical, to within a delay or time lag, the value of the latter being equal to the duration T of the transmitted binary symbol. Thus, the following relation is obtained:

$$S2(t)=S1(t-T).$$

This filter also performs the correlation operation between the input signal and the pseudo-random sequence used for spreading the spectrum. Thus, we obtain for channel 1:

$$S1(t)=E1(t)*I(t),$$

where the symbol * symbolizes the convolution operation and I(t) the pulse response of the first channel of the filter. This base band pulse response is the time-reversed pseudo-random sequence, so that S1 is the correlation product between E1 and the pseudo-random sequence.

The input transducer can be a split finger transducer with a reduced number of electrodes, so as to have a sufficiently wide pass band. The surface acoustic wave (or RAYLEIGH wave) propagates from said transducer on the surface of the piezoelectric material with a speed of approximately 3150 m/s. It then passes beneath the electrode of the correlator C1, whose length corresponds to the duration of a binary information element. For a system with a data rate of 256 kb/s, the length of the output electrode is:

$$L=3150/256 \cdot 10^3,$$

i.e. L=12.3 mm.

Each output transducer can be constituted by a split finger transducer having 255 elements. Each element constituted by several complementary electrodes corresponds to one of the chips of the pseudo-random spreading sequence. These elements are polarized according to the value of the corresponding chip and obviously the final chip of the sequence corresponds to the element closest to said input transducer. When the acoustic signal which is modulated by the pseudo-random sequence is in phase with all the elements, the output signal is at a maximum. Thus, at the output of said filter, there is a pulse whose mid-height width is 15 ns (duration of a chip) every 3.9 μs (duration of an information bit).

The second channel of the surface acoustic wave component differs from the first by the position of the output transducer. The input and output electrodes of the two channels are identical, but the output transducer of the second correlator is placed at such a distance from the input transducer that the signal S2 is delayed by a time T corresponding to one information bit compared with S1, so as to obtain the relation S2(t)=S1(t−T). This delay must be obtained with great accuracy, but in particular said accuracy must apply throughout the frequency band used for the spread spectrum modulation. In the considered embodiment, the output transducer of the second channel has been optimized to take account of the attenuations and distortions produced by the propagation of the acoustic waves on the substrate, in such a way that the relation S2(t)=S1(t−T) is proved throughout the considered frequency band. Thus, a perfect delay can be obtained through this bias.

Moreover, the accuracy on the delay must be very great. Thus, the two signals S1 and S2 have a centre frequency equal to the intermediate frequency of the receiver, which in the considered embodiment is 261.12 MHz, i.e. four times the chip frequency. It is then a question of comparing the phase of the signals S1 and S2, because the information is carried by the phase difference between these two signals. In order that said comparison is valid, it is therefore necessary that the error on the delay does not lead to an error on the phase exceeding about 10° at the frequency of 261.12 MHz. This corresponds to an error on the maximum delay of about 100 picoseconds for a 3.9 microsecond delay.

As the component has an operating temperature range which can vary by more than 50°, it is necessary that the delay does not fluctuate by more than 100 ps throughout the range.

FIG. 3 shows an embodiment of the surface acoustic wave device. The latter comprises two similar channels, whose elements are designated by the references carrying respectively the subscripts 1 and 2. It is merely necessary to describe one of these. The first channel comprises a strip $70_1$ serving as the piezoelectric substrate. This strip is preferably of quartz with a section ST. The input transducer $TR_1$ is connected to an earth terminal $71_1$ and to an input terminal $72_1$. An acoustic or sound absorber $73_1$ is placed on the left-hand part of the transducer. Thus, only the acoustic wave propagating to the right is used. One of the electrodes of the transducer F1 is connected to an output terminal $74_1$ and the other to an earth element $75_1$. A sound absorber $76_1$ is placed to the rear of the output transducer.

The second channel is similar to the first, except that the second output transducer is shifted downstream on its piezoelectric strip, as has already been stated and is optimized to take account of propagation distortions.

Figure 4:
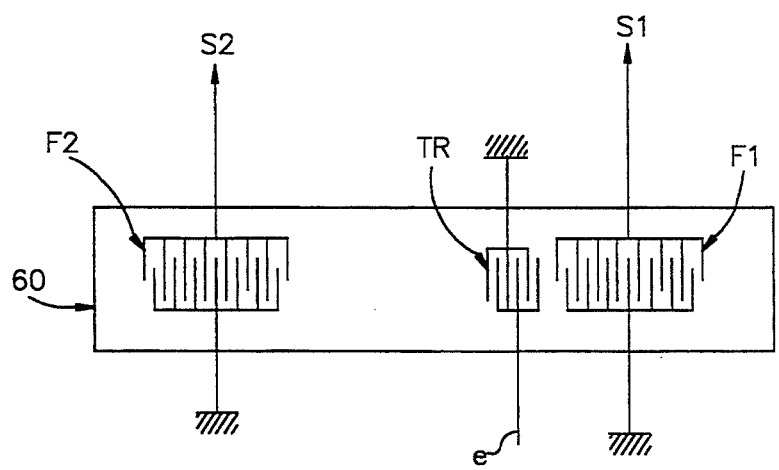
FIG. 4 Shows a component according to another variant.

FIG. 4 shows another variant of part of the component of the invention with a single input transducer TR connected to a single input E. Two surface waves emanate from this transducer, the one to the right towards the output transducer F1, the other to the left towards the output transducer F2, the second being further from TR than the first.

Figure 5:
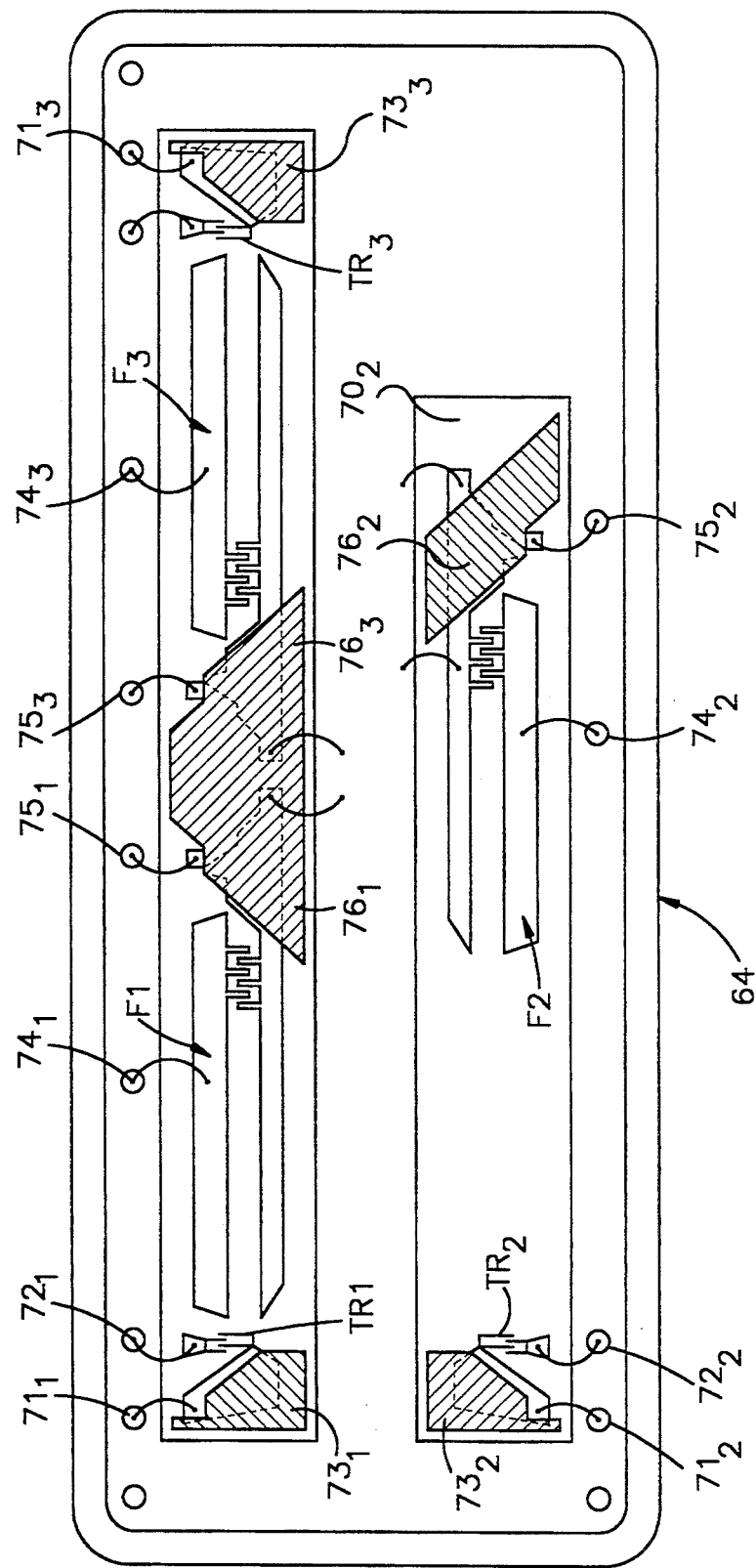
FIG. 5 Shows an embodiment of the component for a differential transceiver.

FIG. 5 shows an embodiment of a component 80 for a transceiver according to the invention. The reception channel of this component 80 corresponds to the embodiment of the component for the receiver illustrated in FIG. 3. On considering FIG. 3, it is clear that it is particularly simple to use the space left free on the piezoelectric strip $70_1$ (top right in FIG. 3) in order to provide a third surface acoustic wave filter which will be used on transmission and this filter can be identical to those of the reception channel.

In the illustrated case, the transmission filter has on the piezoelectric strip $70_1$ supporting the first reception channel, an input transducer TR3 connected to an earth terminal $71_3$ and to an input terminal $72_3$, a sound absorber $73_3$ placed to the right of the transducer, an output transducer F3, whereof one of the electrodes is connected to an output terminal $74_3$ and the other to an earth element $75_3$ and finally a sound absorber $76_3$ to the rear of the output transducer. This sound absorber $76_3$ coincides with the sound absorber $76_1$ of the transducer F1 of the first reception channel.

The component 80 of FIG. 5 can be used in a differential transceiver with spread spectrum. As a result of its perfect symmetry, the component transmits and receives very similar signals, so that a certain number of circuits used in the transmission channel can be shared with certain circuits of the reception channel. This is illustrated in FIG. 6, which shows a differential transceiver according to the invention, at least in its upstream part up to the component 80, the downstream part being the same as in FIG. 1 (outputs S1, S2, multiplier 38 and base band stage).

The transceiver shown in FIG. 5 comprises in general terms a certain number of means found in any transceiver, namely:

A) a transmission channel incorporating:
- means 130 for encoding an information D into binary symbols having a certain duration T,
- a filter having a pulse response which is a pseudo-random sequence of duration equal to the duration T of a binary information symbol,
- means for converting the intermediate frequency signal into a radio-frequency signal, said means incorporating a local oscillator 110 and a mixer 112,
- a radio-frequency amplifier $102_2$, a band-pass filter 104 and a transmitting antenna 100, B) a reception channel incorporating:
- a receiving antenna 100 and a radio-frequency amplifier $102_1$,
- means for converting the radio-frequency signal into an intermediate frequency signal,
- a device for processing the intermediate frequency signals incorporating means able to carry out a correlation between the intermediate frequency signal and the pseudo-random sequence used on transmission,
- demodulating and processing means for the demodulated signal (shown in FIG. 1, but not in FIG. 6), said stage restoring the information D used on transmission.

Figure 6:
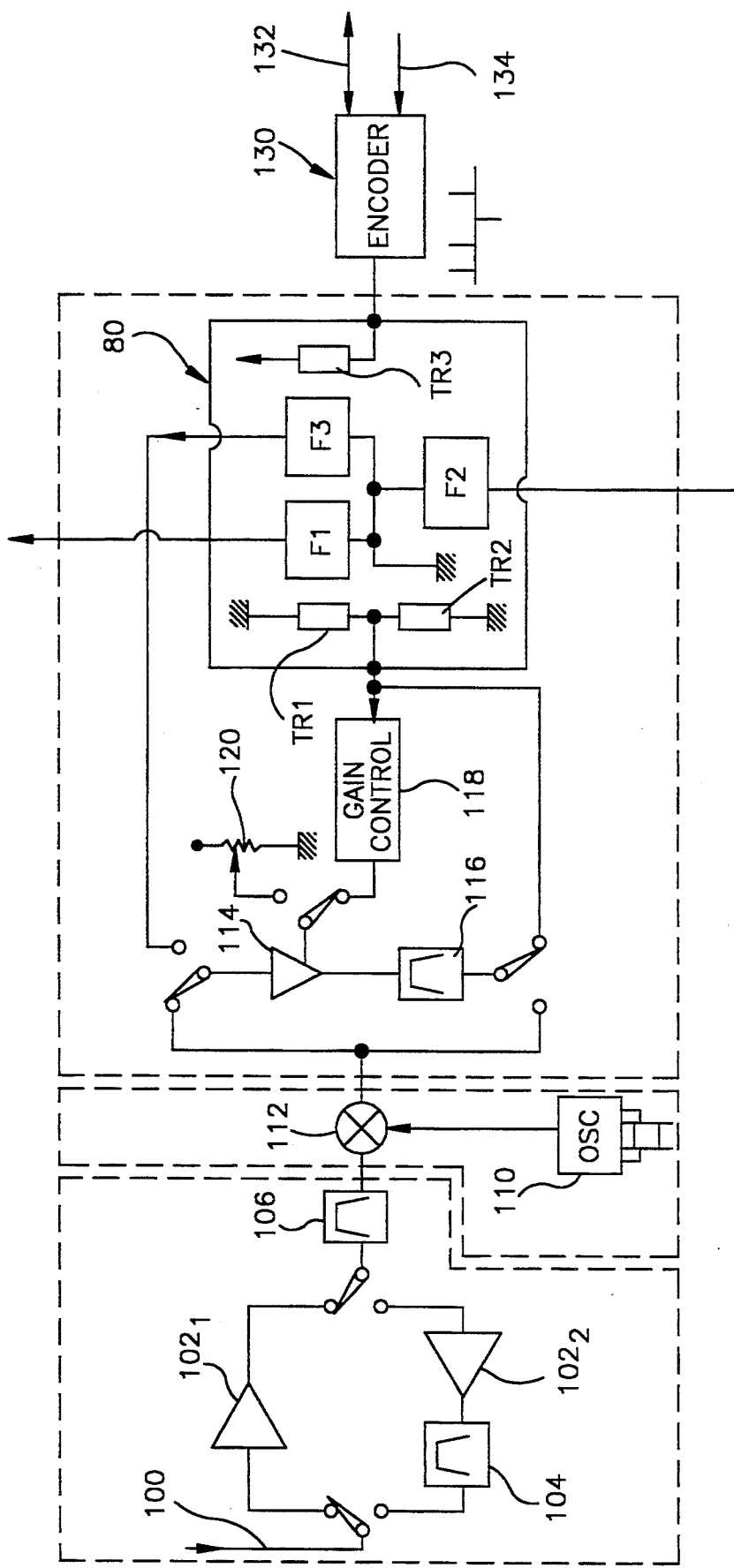
FIG. 6 Shows a differential transceiver according to the invention.

The differential transceiver of FIG. 6 is characterized in that it comprises the transceiver component 80 described hereinbefore, said component 80 being used in the transmission channel TR3, F3 for producing the spread spectrum intermediate frequency signal and in the reception channel TR1, F1, TR2, F2 as the processing device for the intermediate frequency signal able to carry out a correlation with the pseudo-random sequence used on transmission.

Moreover, the transceiver of FIG. 6 is characterized in that the means 110, 112 of the transmission channel for converting the intermediate frequency signal into a radio-frequency signal are the same as the means of the reception channel for converting the radio-frequency signal into an intermediate frequency signal.

With regards to the antenna 100 of the transmission channel, it is common to the antenna of the reception channel, said common antenna being connected to the common frequency converting means 110, 112 by a reception amplifier $102_1$ and a transmission amplifier $102_2$ connected in parallel. A first switch I1 connects the common antenna 100 either to the reception amplifier $102_1$ or to the transmission amplifier $102_2$. A second switch I2 is also provided for connecting, in synchronism with the first, either the reception amplifier $102_1$ or the transmission amplifier $102_2$ to the common signal converting means 110, 112. A band-pass filter 104 can be provided just after the amplifier $102_2$.

In the illustrated embodiment, the transceiver also comprises:
- an intermediate frequency amplifier 114,
- an intermediate frequency band-pass filter 116,
- a third switch I3 connecting the input of said amplifier 114 either to the common frequency converting means 110, 112, or to the transmission channel TR3, F3 of the component 80,
- a fourth switch I4 for connecting in synchronism with the third switch I3, the output of the band-pass filter 116 either to the reception channel TR1, F1, TR2, F2, or to the common frequency converting means 110, 112.

There is also an automatic gain control circuit 118 for controlling the gain of the amplifier 114 on the basis of the signal received.

The structure of FIG. 6 clearly shows the use of several subassemblies both on transmission and on reception. The passage from the transmission mode to reception mode takes place by means of the switches I1 to I5. These switches can be diode switches, so that the passage between the modes takes place rapidly. In FIG. 6 all the switches are in the reception position R.

In the reception mode, the signal supplied by the antenna is amplified by $102_1$ and filtered by 106, whose band is equal to or greater than Bes. In the transmission mode, the signal at the output of the mixer 112 is filtered by 106, amplified by $102_2$ and then amplified again by 104 before being transmitted by the antenna 100. The filter 104 is necessary for preventing any minor lobe, which could be produced by non-linearities in the amplifier $102_2$.

The mixer 112 functions as a down converter in the reception mode, i.e. the signal present at the input is mixed with the local oscillator signal and the frequency of the signal supplied in intermediate frequency is the difference of the frequencies between the frequency of the local oscillator and the radio-frequency, the intermediate frequency being below the local oscillator frequency and the radio-frequency, the frequency FI being below the frequencies OL and RF.

It functions as an upconverter in the transmission mode and the signal present at the input is mixed with the local oscillator signal to produce the radio-frequency signal, whose frequency exceeds the intermediate frequency.

The intermediate frequency stages function in the following way in the reception mode. The intermediate frequency signal at the output 112 is amplified by 114 and filtered by 116, whose band exceeds Bes, before being injected at the input of the component 80, whose operation has been described hereinbefore. The gain control circuit 118 automatically adjusts the gain 114 in such a way that the power of the intermediate frequency signal at the reception input of the filtered component is constant. The signal is applied to two input electrodes TR1, TR2 of the component 80. The two filter outputs S1, S2 are identical, with the exception of a delay, the value of said delay being T, which is the duration of the transmitted binary symbol, as stated hereinbefore.

In the transmission mode, the switches I1 to I5 are in position E. In order to produce the transmission signal, use is made of the transmission channel of the component 80. This channel is strictly identical to the first reception channel of the first component used, except that the pulse response of the channel in transmission is the pseudo-random sequence itself and not the time-reversed pseudo-random sequence.

If $I_E(t)$ is said pulse response, it is therefore possible to write $$I_E(t) = I_1(T-t).$$

If this emission filter receives a DIRAC pulse $\delta(t)$ at its input, the filter output is $$S_E(t) = \delta(t) * I_E(t) = I_E(t).$$

The surface acoustic wave component F3 thus makes it possible to directly produce the intermediate frequency signal modulated by the pseudo-random sequence, provided that a very short duration pulse is injected at its input. The modulation by the binary dam to be transmitted is obtained by reversing the polarity of said pulse.

Therefore, at its input, the filter F3 has positive or negative pulses, as a function of the polarity of the data D to be transmitted. These pulses are separated by a time T equal to the duration of the binary symbol. Obviously this duration T is also equal to the duration of the pulse response of the filter F3.

In the transmission mode, the gain of the amplifier 114 is fixed and preregulated with the aid of a potentiometer 120. It is possible to use this gain control input of the amplifier 114 for regulating the transmission power either with the aid of calibrated voltages, or with the aid of an automatic gain control loop, whose input instruction would be the power of the signal transmitted by the antenna.

We claim:

1. Component for a differential transmitter-receiver for signals with direct sequence spread spectrum, comprising:
   a) a transmission channel incorporating a filter (F3) having a pulse response which is a pseudo-random sequence, said filter comprising a first surface acoustic wave device with a first input transducer (TR3) and a first output transducer (F3), and
   b) a reception channel comprising:
   a first correlator (TR1, F1) able to perform the correlation between a signal applied to its input and a pseudo-random sequence identical to that used in the transmission channel, and
   a second correlator (TR2, F2) differing from the first correlator solely by the fact that the signal at the output of said second correlator is delayed by a period (T) corresponding to the duration of a received binary information symbol, the first and second correlators (TR1, F1) (TR2, F2) being filters, whose pulse response is the pseudo-random sequence used in the transmission channel, but reversed in time,
   said first correlator comprising a second surface acoustic wave device with a second input transducer (TR1) and a second output transducer (F1), and
   said second correlator comprising a third surface acoustic wave device with a third input transducer (TR2) and a third output transducer (F2).

2. Component for a differential transmitter-receiver according to claim 1, characterized in that the output transducer (F3) of the transmission channel is connected in the form of a split finger transducer having a length such that the time taken by the acoustic waves for passing through it is equal to the period (T) corresponding to the duration (T) of a transmitted and received binary information symbol.

3. Component for a differential transmitter-receiver according to claim 1, characterized in that the surface acoustic wave device (TR3, F3) of the transmission channel and the surface acoustic wave device (TR1, F1) of the first correlator of the reception channel are produced on the same piezoelectric substrate ($70_1$).

4. Component for a differential transmitter-receiver according to claim 3, characterized in that the surface acoustic wave device (TR3, F3) of the transmission channel and the surface acoustic wave device (TR1, F1) of the first correlator of the reception channel are arranged substantially symmetrically to one another on the same piezoelectric substrate ($70_1$).

5. Direct sequence spread spectrum differential transmitter-receiver incorporating:
   A) a transmission channel incorporating:
   means (130) for encoding an information (D) into binary symbols having a certain duration (T),
   a filter having a pulsed response which is a pseudo-random sequence of duration equal to the duration (T) of a binary information symbol,
   means (110, 112) for converting the intermediate frequency signal into a radio-frequency signal,
   a transmission antenna (100),
   B) a reception channel incorporating:
   a reception antenna (100) and a radio-frequency amplifier ($102_2$),
   means (110, 112) for converting the radio-frequency signal into an intermediate frequency signal,
   a device for processing the intermediate frequency signals incorporating means (TR1, F1, TR2, F2) able to perform a correlation between the intermediate frequency signal and the pseudo-random sequence used on transmission,
   means (38) for demodulating and processing the demodulated signal (42, 44, 46, 52), said stage restoring the information (D) used on transmission, said differential transmitter-receiver being characterized in that it comprises the transmitter-receiver component (80) according to any one of the claims 1 to 5, said component (80) being used in its transmission channel (TR3, F3) for producing the spread spectrum intermediate frequency signal, said component (80) also being used in its reception channel (TR1, F1) (TR2, F2) as the processing device of the intermediate frequency signal able to perform a correlation with the pseudo-random sequence used on transmission, said transmitter-receiver also being characterized in that the means (110, 112) of the transmission channel for converting the intermediate frequency signal into a radio-frequency signal are the same as the means (110, 112) of the reception channel for converting the radio-frequency signal into an intermediate frequency signal.

6. Differential transmitter-receiver according to claim 5, characterized in that the antenna (100) of the transmission channel is common to the antenna (100) of the reception channel, said common antenna (100) being connected to common frequency converting means (110, 112) by a reception amplifier ($102_1$) and a transmission amplifier ($102_2$) connected in parallel, a first switch ($I1$) being provided for connecting the common antenna (100) either to the reception amplifier ($102_1$) or to the transmission amplifier ($102_2$), a second switch ($I_2$) being provided for connecting, in synchronism with the first, either the reception amplifier ($102_1$), or the transmission amplifier ($102_2$) to the common frequency converting means (110, 112).

7. Transmitter-receiver according to claim 5, characterized in that it also comprises:
   an intermediate frequency amplifier (114),
   an intermediate frequency band-pass filter (116), a third switch (I3) connecting the input of said amplifier (114) either to the common frequency converting means (110, 112), or to the transmission channel (TR3, F3) of the component (80),
a fourth switch (I4) for connecting, in synchronism with the third switch (I3), the output of the bandpass filter (116) either to the reception channel (TR1, F1) (TR2, F2), or to the common frequency converting means (110, 112).

* * * * *

UNITED STATES PATENT AND TRADEMARK OFFICE
CERTIFICATE OF CORRECTION

PATENT NO. : 5,434,893                    Page 1 of 2
DATED      : July 18, 1995
INVENTOR(S) : Le Roy et al.

It is certified that error appears in the above-indentified patent and that said Letters Patent is hereby corrected as shown below:

Title page, item [73], Assignee: the following information should be inserted with respect to the assignee: --Commissariat A L'Energie Atomique--.

Title page, insert, the following information should be inserted with respect to the Attorney, Agent or Firm: --Pearne, Gordon, McCoy & Granger--.

Title page, item [56] References Cited, please insert the following references under U.S. Patent Documents: --4,995,052 2/1991 Thorvaldsen; 4,998,261 3/1991 van Driest, et al.; 5,243,622 9/1993 Lux, et al.; 5,276,703 1/1994 Budin, et al.; 5,289,499 2/1994 Weerackody; 5,345,472 9/1994 Lee--.

Column 4, lines 44 and 45, delete "spectrum communications" and insert --spectrumcommunications--.

Column 5, lines 38 and 39, delete "transmitter receiver" and insert --transmitter-receiver--.

UNITED STATES PATENT AND TRADEMARK OFFICE
CERTIFICATE OF CORRECTION

PATENT NO. : 5,434,893
DATED : July 18, 1995
INVENTOR(S) : Le Roy et al.

It is certified that error appears in the above-indentified patent and that said Letters Patent is hereby corrected as shown below:

Column 11, line 8, delete "dam" and insert --data--.

Signed and Sealed this

Twenty-third Day of July, 1996

Attest:

BRUCE LEHMAN

*Attesting Officer*     *Commissioner of Patents and Trademarks*